United States Patent
Lin et al.

(10) Patent No.: US 11,732,379 B2
(45) Date of Patent: Aug. 22, 2023

(54) TREATMENT SYSTEM AND METHOD

(71) Applicant: Taiwan Semiconductor Manufacturing Co., Ltd., Hsinchu (TW)

(72) Inventors: Zong-Kun Lin, Hsinchu (TW); Hsuan-Chih Chu, Hsinchu (TW); Chien-Hsun Pan, Taichung (TW); Yen-Yu Chen, Taichung (TW); Yi-Ming Dai, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 283 days.

(21) Appl. No.: 16/901,967

(22) Filed: Jun. 15, 2020

(65) Prior Publication Data
US 2021/0388524 A1 Dec. 16, 2021

(51) Int. Cl.
*B01D 61/18* (2006.01)
*B01D 63/16* (2006.01)
*C25D 21/06* (2006.01)

(52) U.S. Cl.
CPC ............ *C25D 21/06* (2013.01); *B01D 61/18* (2013.01); *B01D 63/16* (2013.01);
(Continued)

(58) Field of Classification Search
CPC ........ C25D 21/06; C25D 21/18; C25D 17/00; C25D 21/00; C25D 21/02; C25D 21/08;
(Continued)

(56) References Cited

U.S. PATENT DOCUMENTS 6,848,457 B2  2/2005  Marumo et al.
7,396,464 B2  7/2008  Sternad et al.
(Continued)

FOREIGN PATENT DOCUMENTS

CN   1286541 C   11/2006
CN   1958120 B   1/2012
(Continued)

OTHER PUBLICATIONS

English language machine translation of CN204352862, 6 pages, No Date.*
English language machine translation of JPH08266822, 6 pages, No Date.*
English language machine translation of CN 109260822, 6 pages, No Date.*

*Primary Examiner* — Pranav N Patel
(74) *Attorney, Agent, or Firm* — Seed Intellectual Property Law Group LLP

(57) ABSTRACT

The treatment system provides a feature that may reduce cost of the electrochemical plating process by reusing the virgin makeup solution in the spent electrochemical plating bath. The treatment system provides a rotating filter shaft which receives the spent electrochemical plating bath and captures the additives and by-products created by the additives during the electrochemical plating process. To capture the additives and the by-products, the rotating filter shaft includes one or more types of membranes. Materials such as semi-permeable membrane are used to capture the used additives and by-products in the spent electrochemical plating bath. The treatment system may be equipped with an electrochemical sensor to monitor a level of additives in the filtered electrochemical plating bath.

20 Claims, 7 Drawing Sheets

(52) U.S. Cl.
CPC .. *B01D 2311/2642* (2013.01); *B01D 2313/18* (2013.01); *B01D 2313/22* (2013.01); *B01D 2313/44* (2013.01)

(58) Field of Classification Search
CPC ........ C25D 21/12; B01D 61/18; B01D 63/16; B01D 2311/2642; B01D 2313/18; B01D 2313/22; B01D 2313/44; B01D 2311/04; B01D 2315/02; B01D 46/60; B01D 29/52; B01D 29/96; B01D 29/54; B01D 29/15; B01D 29/23; B01D 33/35
See application file for complete search history.

(56) References Cited

U.S. PATENT DOCUMENTS

| | | | |
|---|---|---|---|
| 7,638,051 B2 | 12/2009 | Stadler | |
| 2013/0270171 A1* | 10/2013 | Ben-Horin | F16L 15/04 210/345 |
| 2017/0152152 A1* | 6/2017 | Smallhorn | C02F 1/4695 |

FOREIGN PATENT DOCUMENTS

| | | | |
|---|---|---|---|
| CN | 204352862 | * | 5/2015 |
| CN | 207520710 U | | 6/2018 |
| CN | 109260822 | * | 1/2019 |
| JP | H08266822 | * | 10/1996 |
| TW | 509971 B | | 11/2002 |

* cited by examiner

TREATMENT SYSTEM AND METHOD

PRIORITY CLAIM AND CROSS-REFERENCE

None.

BACKGROUND

To produce semiconductor devices, a semiconductor substrate, such as a silicon wafer, which is a raw material for the semiconductor devices, must go through a sequence of complicated and precise process steps such as diffusion, ion implantation, chemical vapor deposition, photolithography, etch, physical vapor deposition, chemical mechanical polishing, and electrochemical plating.

The electrochemical plating is generally used to deposit one or more layers on the semiconductor substrate. For example, metals such as copper and aluminum are deposited through the electrochemical plating step. In addition to adding one or more layers on the semiconductor substrate, the electrochemical plating is implemented to fill metals such as copper and aluminum into trench structures (interconnect structures or gaps) on the semiconductor substrate.

For example, during the process of filling the trench structures with copper, the semiconductor substrate and copper source are placed in a plating bath. The plating bath typically contains copper sulfate and sulfuric acid. To enable high-quality copper fill from the bottom of the trench structures (gaps) to the top of the trench structures, various types of proprietary organic additives are added in the plating bath: an accelerator for accelerating deposition at the bottom in the trench; a suppressor for suppressing plating on the sidewalls in the trench; and a leveler for minimizing bumps after the fill is completed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
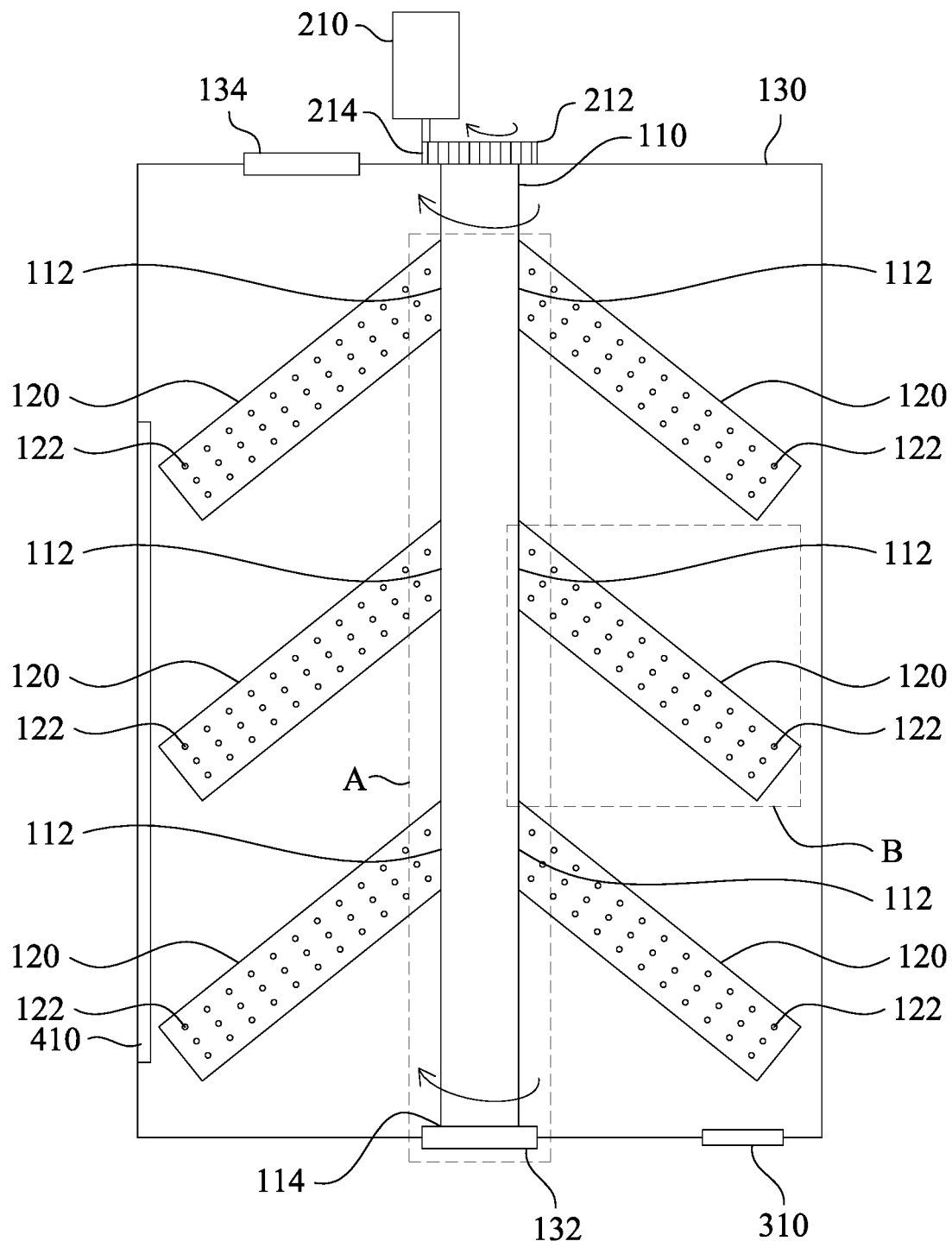
FIG. 1 is a sectional view of the treatment system 100 with the hollow member 110 disposed in a vertical direction according to one or more embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments in accordance with the subject matter described herein include a treatment system that is able to recycle spent electrochemical plating bath used in semiconductor fabrication so the same electrochemical plating bath can be used more than once by removing additives (including by-products of additive which were created during the electrochemical plating process) during the recycling process. As used herein, unless otherwise specifically indicated, the term "additives" refers to both an additive, such as an accelerator, a suppressor, a leveler and by-products created during the electrochemical plating process. Examples of by-products formed during the electrochemical plating process include by-products formed by a reaction between the accelerator, suppressor or leveler with metal materials the accelerator, suppressor or leveler contact, such as the anode or the cathode in an electroplating chamber. Organic additives refers to materials dosed into the electroplating bath such as accelerators, suppressors, levelers or other organic additives added to the electroplating bath to improve the results of the electroplating process. Embodiments of such treatment systems capable of separating additives from the spent electrochemical plating bath include a hollow member 110 located in a container 130 that is used to separate the additives from the spent electrochemical plating bath.

FIG. 1 is a sectional view of the treatment system 100 with the hollow member 110 disposed in a vertical direction according to one or more embodiments of the present disclosure.

Referring to FIG. 1, the treatment system 100 includes a hollow member 110, arm member 120, and container 130. Hollow member 110 and the arm member 120 are configured to capture the additives in the spent electrochemical plating bath. Container 130 provides a space for the hollow member 110 and the arm member 120. A volume of container 130 not occupied by hollow member 110 and arm member 120 provide a volume for capturing spent electrochemical plating bath filtered through hollow member 110 and the arm member 120. In the illustrated embodiment, the treatment system 100 is associated with an electrochemical plating tool (bath) and receives spent electrochemical plating bath from the electrochemical plating tool. In the illustrated embodiment, the treatment system 100 is also associated with the electrochemical plating tool (bath) (or a chemical storage container that stores the spent electrochemical plating bath after being treated by the treatment system 100 or a virgin makeup solution supply system that is used to mix the spent electrochemical plating bath after being treated by the treatment system 100 with the additives discussed above) so the treatment system 100 is able to return the spent electrochemical plating bath that has been processed by the treatment system 100 to remove additives from the spent electrochemical plating bath. In the illustrated embodiment, the hollow member 110 extends from the bottom side of the container 130 to the top side of the container 130. However, in some embodiments, the hollow member 110 does not extend completely to the top side of the container 130. As illustrated in FIG. 1, a drive mechanism, which rotates the hollow member 110, is located on the top side of the container 130. However, the drive mechanism may be located on the bottom side of the container 130. Details of the drive mechanism will be provided later in the present disclosure.

In accordance with embodiments illustrated in FIG. 1, the container 130 includes a top side and a bottom side. Container 130 also includes a first inlet port 132 on the bottom side of the container 130 and a first outlet port 134 on the top of the container 130. First inlet port 132, which is on the bottom of the container 130, receives the spent electrochemical plating bath from the electrochemical plating tool. First outlet port 134, which is on the top side of the container 130, releases spent electrochemical plating bath which has been treated in accordance with embodiments of the present disclosure to remove additives. The spent electrochemical plating bath released through the first outlet port 134 can be returned to a source of virgin electroplating bath supply system which supplies virgin electroplating bath to the electrochemical plating tool or supplies virgin electroplating bath to other systems.

Container 130 is constructed of any suitable material that can store the spent electrochemical plating bath without altering its chemical make-up and is resistant to degradation from coming in contact with the spent electrochemical plating bath. For example, the container 130 may be constructed of plastic, metal, composite material, glass, the like, or combinations thereof. Container 130 is not limited to being constructed from the exemplary materials mentioned above but may be formed of any material that can store the spent electrochemical plating bath without altering its chemical make-up and is resistant to degradation from coming in contact with the spent electrochemical plating bath.

First inlet port 132 is sized and shaped to receive an incoming connection from the electrochemical plating tool. First outlet port 134 is sized and shaped to receive a connection to the electrochemical plating tool. First inlet port 132 and the first outlet port 134 are constructed of any suitable material that does not alter the chemical make-up of the spent electroplating bath exiting the container 130 and is resistant to degradation from coming in contact with the spent electrochemical plating bath. For non-limiting example, the first inlet port 132 and the first outlet port 134 may be constructed of plastic, metal, composite material and the like, and combinations thereof.

In accordance with embodiments illustrated in FIG. 1, in the container 130, the hollow member 110 is disposed, such that its longitudinal axis is oriented in a vertical direction. Hollow member 110 includes at least one side outlet 112 which is disposed on a side of the hollow member 110. An arm member 120 is connected to the hollow member 110 at the side outlet 112 and is in fluid communication with the interior of hollow member 110 via side outlet 112. Hollow member 110 further includes a second inlet port 114 at the bottom end of the hollow member 110. Second inlet port 114 of the hollow member 110 is coupled to the first inlet port 132 of the container 130. In other words, spent electrochemical plating bath that is supplied to the first inlet port 132 of the container 130 is able to flow into the interior of hollow member 110 via second inlet port 114. As a result, spent electrochemical plating bath flows into the container 130 in the following order: the second inlet port 114 of the hollow member 110, the second inlet port of the hollow member 110, the side outlet of the hollow member 110, and the arm member 120. As described in more detail below, in accordance with some embodiments of the present disclosure, some of the spent electrochemical plating bath can be filtered in the hollow member 110 instead of being filtered in the arm member 120.

Hollow member 110 is constructed of any suitable material that can contain and direct the spent electrochemical plating bath from the first inlet port 132 of the container 130 to the arm member 120 without altering its chemical make-up and without degrading from coming in contact with the spent electrochemical plating bath. In addition, the hollow member 110 is constructed of any suitable materials that can support the weight of arm member 120 in the container 130. As shown in the embodiment illustrated in FIG. 1, the arm member 120 can be one arm member 120 or more. In the illustrated embodiments, six arm members 120 are present; however, embodiments of the present disclosure include hollow member 110 to which more than six arm members or fewer than six arm members are connected. The hollow member 110 should be constructed of a material that is strong enough to support the rotation of the hollow member 110 (i.e., clockwise or counterclockwise) in the container 130 as further described below. As non-limiting examples, the hollow member 110 may be constructed of plastic, metal, composite material and the like, and combinations thereof.

An embodiment of arm member 120 includes a first end and a second end. Arm member 120 also has a top side and a bottom side. The first end of the arm member 120 is coupled to the side outlet 112 of the hollow member 110. In accordance with one or more embodiments of the present disclosure, holes 122 pass through the arm member 120. As a non-limiting example, the arm member 120 includes the holes 122 on the second end of the arm member 120. In the illustrated embodiment, arm member 120 also includes holes 122 passing through the top side of arm member 120. In the illustrated embodiment, arm member 120 includes holes 122 passing through the bottom side of arm member 120. Arm member 120 may include the holes 122 in any of the combinations of locations described above. In accordance with one or more embodiments of the present disclosure, the arm member 120 is filled with a membrane 162 (not shown in FIG. 1 but shown in FIG. 5). The membrane 162 is constructed of any suitable material through which a virgin electroplating bath can pass and through which additives cannot pass. Non-limiting examples, of material from which the membrane 162 is formed include at least one of polypropylene, polyethersulfone, polytetrafluoroethylene, polyvinylidene fluoride, polyamide, ceramic material, or semi-permeable membrane material and the like.

The above materials, such as semi-permeable membrane, capture the organic additives and by-products of the organic additives in the spent electrochemical plating bath by preventing the organic additives and by-products of the organic additives from passing through the membrane. The spent electrochemical plating bath includes virgin electroplating bath containing among other things, Cu salt, acid, and halide and the additives. The additives include organic materials such as accelerator (mercapto family), suppressor (polyglycol family), leveler (nitrogen-containing molecules) and by-products of the electroplating process which produced the spent electrochemical plating bath. Examples of by-produces of the electroplating process include among other things, by-products resulting from the interaction of the organic additives and the anodes (e.g., copper anode) used in the electroplating process. For convenience, the organic additives and the by-products are collectively referred to as "additive" or "additives" in the present disclosure unless otherwise indicated.

In accordance with embodiments illustrated in FIG. 1, rotation of the hollow member 110 in the container 130 is driven by a drive mechanism to impart a centrifugal force on the spent electrochemical plating bath within hollow member 110 and arm member 120. For example, in the illustrated embodiment of FIG. 1, the drive mechanism includes a motor 210, a first gear 212 on the hollow member 110, and a second gear 214 coupled to the motor 210. In one or more embodiments of the present disclosure, the rotation for the hollow member 110 is set between 60 rpm and 300 rpm. Embodiments in accordance with the present disclosure are not limited to, rotating hollow member 110 between 60 rpm and 300 rpm. For example, in other embodiments in accordance with the present disclosure, the rotation of the hollow member 110 is set below 60 rpm or above 300 rpm. In accordance with embodiments of the present disclosure, the particular rpm at which a hollow member 110 is rotated is chosen such that a desired volume of spent electrochemical plating bath passes through the membranes 152 and 162 without damaging the membranes 152, 162 and other components of the treatment system 100. In other embodiments, the drive mechanism, including second gear 214, is located on the bottom side of the treatment system 100 and the first gear 212 is coupled to the bottom side of hollow member 110.

In accordance with embodiments illustrated in FIG. 1, the treatment system 100 includes a heat transfer member 410 to remove thermal energy from or introduce thermal energy into the spent electrochemical plating bath that is present in hollow member 110, arm member 120 and container 130. Removing thermal energy from the spent electroplating bath will lower the temperature of the spent electroplating bath. Conversely, introducing thermal energy into the spent electroplating bath will increase the temperature of the spent electroplating bath. In accordance with embodiments of the present disclosure, heat transfer member is operated to maintain or adjust the temperature of the spent electroplating bath within container 130 in range between zero degrees Celsius and ten degrees Celsius. Embodiments in accordance with the present disclosure are not limited to maintaining or adjusting the temperature of the spent electrochemical plating bath to be between zero degrees Celsius and ten degrees Celsius. For example, in accordance with other embodiments of the present disclosure, the heat transfer member is operated such that the temperature of the spent electrochemical plating bath in container 130 is less than zero degrees Celsius or greater than 10 degrees Celsius. In accordance with embodiments of the present disclosure, heat transfer member 410 includes any suitable types of a refrigeration system (i.e., cooling pipe, radiator, fan, and chiller) or heating systems (heating pipe, electrical heater and the like). In accordance with some embodiments of the present disclosure, the temperature of the spent electrochemical plating bath within container 130 is adjusted to promote precipitation of by-products of the electrochemical plating process in the spent electrochemical plating bath and/or organic additives in the spent electrochemical plating bath. As explained in more detail below, in accordance with embodiments of the present disclosure, precipitating by-products of the electrochemical plating process in the spent electrochemical plating bath and/or organic additives in the spent electrochemical plating bath produces precipitates which are more readily captured by the membranes described above, due to their size or chemical makeup. When the temperature of the spent electrochemical plating bath within container 130 is below a temperature at which the by-products of the electrochemical plating process and/or the organic additives precipitate organic additives and/or by-products of the electrochemical plating process that pass through the membranes 152, 162 will precipitate out of solution in the volume between the interior of container 130 and the exterior of hollow member 110 and arm member 120. (The first membrane 152 in FIG. 4 will be discussed later in the present disclosure.) Additives that pass through the membranes 152, 162 and precipitate thereafter will collect at the bottom of the container 130 where they can be removed from container via second outlet port 310. Since the first outlet port 134 is located on the top of the container 130, which is away from the bottom of the container 130, the processed spent electrochemical plating that is removed from container 130 without the precipitated additives will collect on the bottom of the container 130.

As noted above, in accordance with embodiments illustrated in FIG. 1, the treatment system 100 includes a second outlet port 310 on the bottom of the container 130 where precipitated additives that collect at the bottom of the container 130 can be removed from container 130. In some embodiments, to efficiently remove precipitated additives that have collected on the bottom of container 130, container 130 includes two or more second outlet ports 310 at different locations on the bottom of the container 130. Since the second outlet port 310 is located on the bottom of the container 130, an operator can open the second outlet port 310 to flush out the precipitated additives that have collected on the bottom of the container 130. The operator also can open the second outlet port 310 to release the spent electrochemical plating bath in the container 130 for maintenance purposes (i.e., cleaning the container 130 and replacing a component in the container 130).

Figure 2:
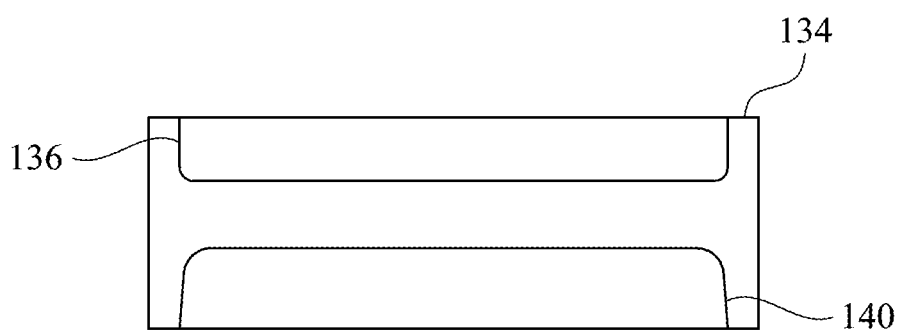
FIG. 2 is a schematic view of the first outlet port 134 according to one or more embodiments of the present disclosure.

FIG. 2 is a schematic view of the first outlet port 134 according to one or more embodiments of the present disclosure.

Referring to FIG. 1 and FIG. 2, the first outlet port 134 on the top of the container 130 includes a first valve 136 and an electrochemical sensor 140. Sensors such as the electrochemical sensor 140 are used to detect the organic additives and/or by-products in the filtered spent electrochemical plating bath. In accordance with embodiments illustrated in FIG. 2, the electrochemical sensor 140 detects the additives in the spent electrochemical plating bath, which was filtered through the membranes 152, 162. All or most of the additives in the spent electrochemical plating bath are captured by the membranes 152, 162 and/or precipitated from solution. However, should an unexpected event (i.e., earthquake or heat transfer member 410 failure) occur, it is possible a significant amount of additives are not captured by the membranes 152, 162. In some cases, the precipitated additives which have collected at the bottom of container 130 may be disturbed due to the unexpected event and become redistributed throughout the fluid occupying the volume between the interior of container 130 and the exterior of hollow member 110 and arm member 120. To constantly monitor the filtered spent electrochemical plating bath in the container 130 before discharging the filtered spent electrochemical plating bath via the first outlet port 134, the first outlet port 134 includes sensor 140.

In accordance with embodiments illustrated in FIG. 2, an electrochemical sensor 140 is associated with the first outlet port 134 such that electrochemical sensor 140 is able to monitor the additive level in the filtered spent electrochemical plating bath. If the electrochemical sensor 140 detects a certain level of the additives in the filtered spent electrochemical plating bath in the container 130, the electrochemical sensor 140 transmits a signal to the first valve 136 directly or indirectly. The level of the additives in the filtered spent electrochemical plating bath, which triggers the signal, is set by an equipment operator based on an electrochemical plating process requirement. In some embodiments, based on the signal from electrochemical sensor 140, which indicates that the level of the additives in the filtered electrochemical plating bath within container 130 is high, the first valve 136 is closed. The embodiments illustrated in FIG. 2 show that the electrochemical sensor 140 is included in the first outlet port 134. However, the present disclosure does not limit the location of the electrochemical sensor 140. The electrochemical sensor 140 can be placed in any suitable locations for monitoring the level of the additives in the filtered spent electrochemical plating bath and transmitting the signal to the first valve 136 directly or indirectly.

Figure 3:
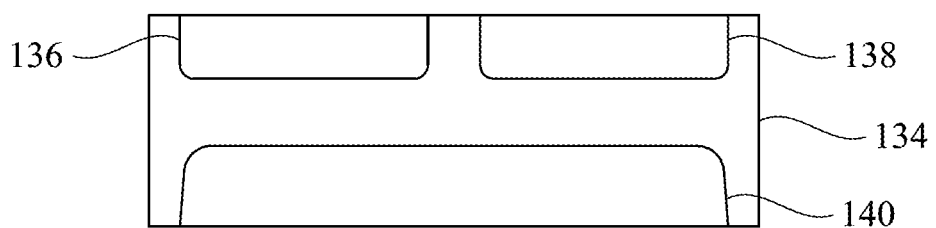
FIG. 3 is a schematic view of the first outlet port 134 according to one or more embodiments of the present disclosure.

FIG. 3 is a schematic view of the first outlet port 134 according to one or more embodiments of the present disclosure.

Referring to FIG. 1 and FIG. 3, the first outlet port 134 located on the top of the container 130 includes first valve 136, a second valve 138, and an electrochemical sensor 140. Sensor 140 in FIG. 3 can be the same as sensor 140 described above with reference to FIG. 2. Electrochemical sensor 140 in FIG. 3 is used to detect the level (i.e., concentration) of additives in the filtered electrochemical plating bath. In accordance with the embodiments illustrated in FIG. 3, the electrochemical sensor 140 detects the level of additives in the processed spent electrochemical plating bath, which was filtered through the membranes 152, 162. All or most of the additives in the spent electrochemical plating bath are generally captured by the membranes 152, 162 or precipitated from solution.

In accordance with the embodiments illustrated in FIG. 3, the electrochemical sensor 140 is associated with the first outlet port 134 to monitor the additive level in the filtered spent electrochemical plating bath within container 130. If the electrochemical sensor 140 detects a certain level of the additives in the filtered spent electrochemical plating bath, the electrochemical sensor 140 is configured to transmit a signal to the first valve 136 and the second valve 138 directly or indirectly. The level of the additives in the spent electrochemical plating bath, which triggers the signal, can be set by an operator based on a plating process requirement. In some embodiments, based on the signal from the electrochemical sensor 140, which indicates that the level of the additives in the container 130 is above the level set by the operator, the first valve 136, which controls the flow of the filtered spent electrochemical plating bath to the electrochemical plating tool, is closed. In some embodiments, based on the signal from the electrochemical sensor 140, which indicates that the level of the additives in the container 130 is above the level set by the operator, the second valve 138, which controls the flow of the filtered spent electrochemical plating bath to a separate temporary plating bath storage container or the first inlet port 132 of the container 130, is opened for additional treatments. In other words, the filtered spent electrochemical plating bath that does not meet the quality standard (level of additives) can be routed back to the treatment system 100 for the additional (filtering) treatments. In some instances, the filtered spent electrochemical plating bath with the high level of the additives is stored in the separate temporary plating bath storage container for the additional (filtering) treatments in the future. The embodiments illustrated in FIG. 3 show that the electrochemical sensor 140 is included in the first outlet port 134. However, the present disclosure does not limit the location of the electrochemical sensor 140. The electrochemical sensor 140 can be placed in any suitable locations for monitoring the level of the additives in the filtered spent electrochemical plating bath and transmitting the signal to the first valve 136 and the second valve 138 directly or indirectly.

Figure 4:
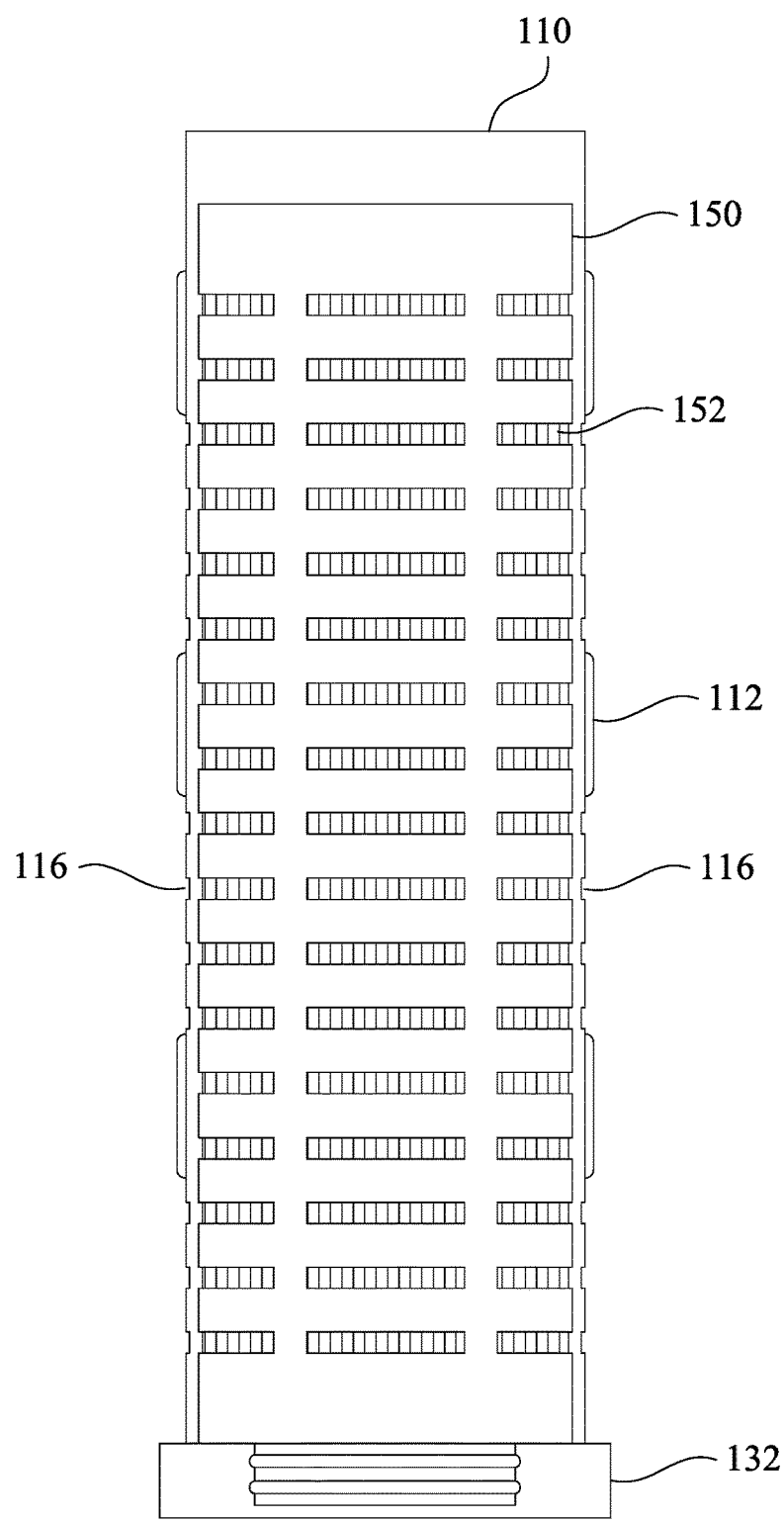
FIG. 4 is a sectional view of the hollow member 110 with a first filter cartridge 150 according to one or more embodiments of the present disclosure.

FIG. 4 is a sectional view of the hollow member 110 with a first filter cartridge 150 according to one or more embodiments of the present disclosure. FIG. 4 also illustrates section A in FIG. 1.

Referring to FIG. 4, as described above, hollow member 110 is connected to the first inlet port 132 of the container 130. Hollow member 110 contains a first filter cartridge 150.

In accordance with embodiments of the present disclosure, when first filter cartridge 150 is used as the main filter, the hollow member 110 also includes one or more openings passing though the walls of the hollow member 110. For non-limiting example, the hollow member 110 includes openings 116 that pass through a top portion of hollow member 110. In the illustrated embodiment, hollow member 110 also includes openings 116 that pass through a middle portion of hollow member 110. In the illustrated embodiment, hollow member 110 includes openings 116 that pass through a bottom portion of hollow member 110. Hollow member 110 may include the openings 116 in any combination of locations described above.

In accordance with embodiments illustrated in FIG. 4, the hollow member 110 contains a first membrane 152 in a cartridge form. The first membrane 152 is constructed of any suitable material that can prevent the passage of the additives through the first membrane and thereby capture the additives within the hollow member 110. As non-limiting examples, the first membrane 152 includes at least one of polypropylene, polyethersulfone, polytetrafluoroethylene, polyvinylidene fluoride, polyamide, ceramic material, or semi-permeable membrane material and the like. In accordance with additional embodiments of the present disclosure, the first membrane is provided within hollow member 110 in a form different than a cartridge form. For example, first membrane 152 can be provided within hollow member 110 in an unsupported form. In accordance with other embodiments, first membrane 152 can be provided by being integrally formed as a part of hollow member 110.

The above materials, such as the semi-permeable membrane, are able to prevent the passage of the organic additives and the by-products in the spent electrochemical plating bath by providing a physical barrier to the organic additives and/or the by-products and/or by binding the organic additives and/or the by-products to the membrane.

To provide a physical barrier to the additives in the spent electrochemical plating bath and thereby capture additives within the hollow member 110, the first membrane 152 is characterized by a pore size that prevents one or more of the additives from passing through the membrane. Examples include membranes that have a pore size between 0.1 and 20 µm. Embodiments in accordance with the present disclosure are not limited to membranes having a pore size within the foregoing range. For example, embodiments in accordance with the present disclosure include membranes having pore sizes less than 0.1 µm and greater than 20 µm. As a result, the additives in the spent electrochemical plating bath are captured by the first membrane 152 in the hollow member 110. In accordance with embodiments of the present disclosure, portions of the spent electrochemical plating bath that are not blocked by the membrane pass through the membrane and through openings 116 in the hollow member 110. The portions of the spent electrochemical plating bath that pass through openings 116 in hollow member 110 are received into the volume of container 130 between the interior of container 130 and the exterior of hollow member 110.

In some embodiments, the first filter cartridge 150 (or the first membrane 152) is used as a pre-filter with arm member 120 serving as a second filter for the spent electrochemical plating bath. In accordance with embodiments of the present disclosure where first filter cartridge 150 serves as a prefilter, and arm member 120 provides a second filter, the pre-filtered spent electrochemical plating bath that has passed through the first membrane 152 is delivered to arm member 120 via the side outlet 112. In accordance with embodiments of the present disclosure, arm member 120 includes membrane 162. In accordance with embodiments of the present disclosure where first filter cartridge 150 serves as a pre-filter, the hollow member 110 does not include openings 116.

In some embodiments, hollow member 110 is not filled with a first membrane 152 or other filtering materials. In such embodiments, the hollow member 110 serves as a pipeline to distribute the spent electrochemical plating bath from the first inlet port 132 of the container 130 to at least one arm member 120. In other words, in accordance with some embodiments of the present disclosure, additives in the spent electrochemical plating bath only get filtered at the arm member 120.

Figure 5:
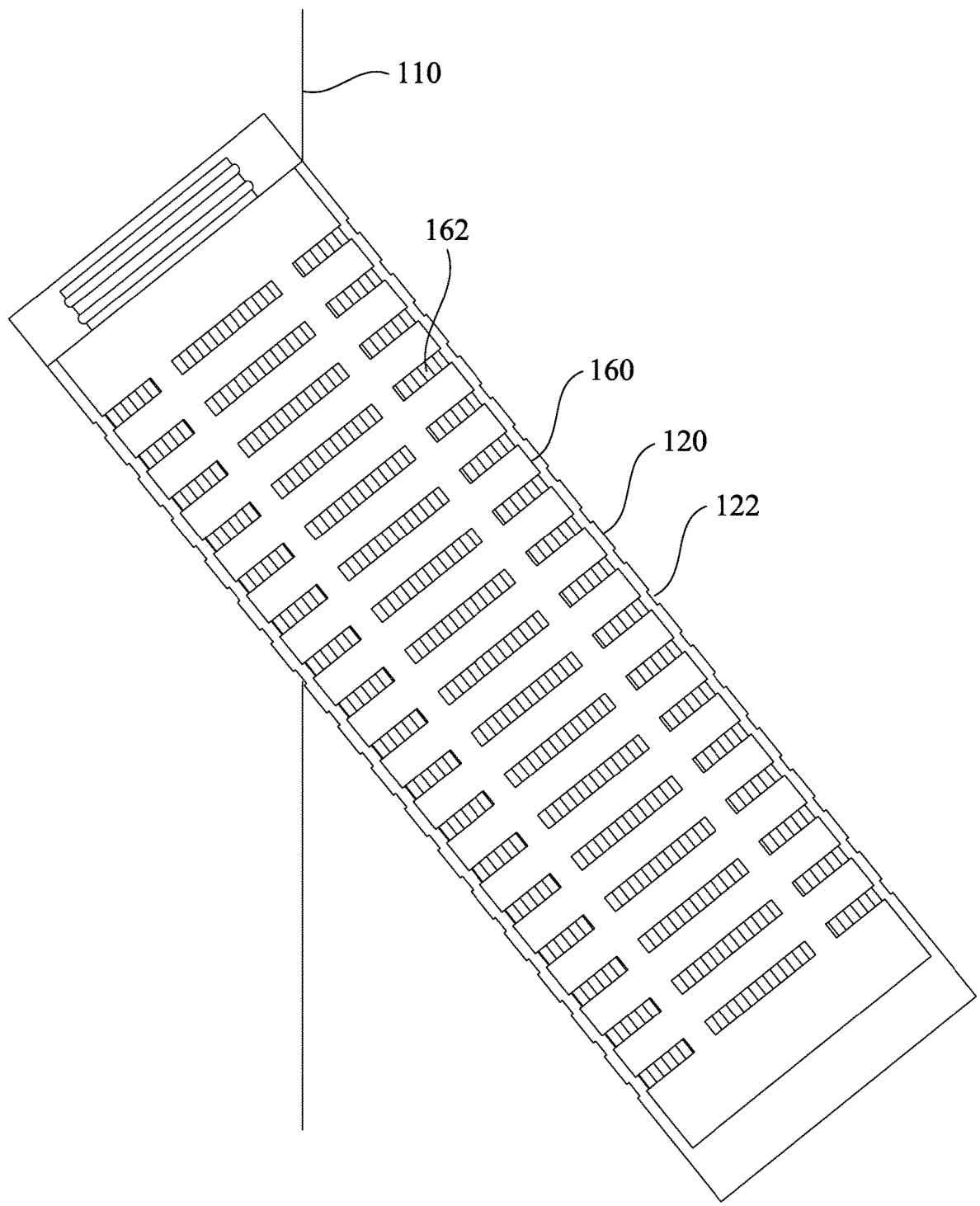
FIG. 5 is a sectional view of the arm member 120 with a filter cartridge 160 according to one or more embodiments of the present disclosure.

FIG. 5 is a sectional view of the arm member 120 with the filter cartridge 160 according to one or more embodiments of the present disclosure. FIG. 5 also illustrates section B in FIG. 1.

Referring to FIG. 5, in accordance with the illustrated embodiment, the arm member 120, which is coupled to the hollow member 110 at side outlet 112, includes a filter cartridge 160. The first end of the arm member 120 is coupled to the hollow member 110 in any suitable manner such as using a screw-on, snap-on connection or is integrally formed with hollow member 110. When integrally formed with hollow member 110, arm member 120 includes a lid or door which allows access to the interior of arm member 120. In some embodiments, the arm member 120 is coupled to the hollow member 110 at an angle, such that the second end of the arm member 120 is closer to the bottom of the container 130 than the first end of the arm member 120.

As noted above, the arm member 120 includes one or more holes 122 passing through portions of arm member 120. For non-limiting example, the arm member 120 includes the holes 122 passing through portions of the second end of the arm 120. In other embodiments arm member 120 includes holes 122 passing through portions of the top side of arm member 120. In other embodiments, arm member 120 includes holes 122 passing through the bottom side of arm member 120. Arm member 120 may include the holes 122 in any combinations of the locations described above. Arm member 120 contains the membrane 162 which serves to remove, (e.g., by capturing) additives from the spent electrochemical plating bath in the same manner as first membrane 152 described above. The description above regarding membrane 152 applies equally to membrane 162.

The embodiments illustrated in FIG. 5 show that the membrane 162 is in the filter cartridge 160. However, the present disclosure does not limit the form of the membrane 162 to a cartridge form.

Figure 6:
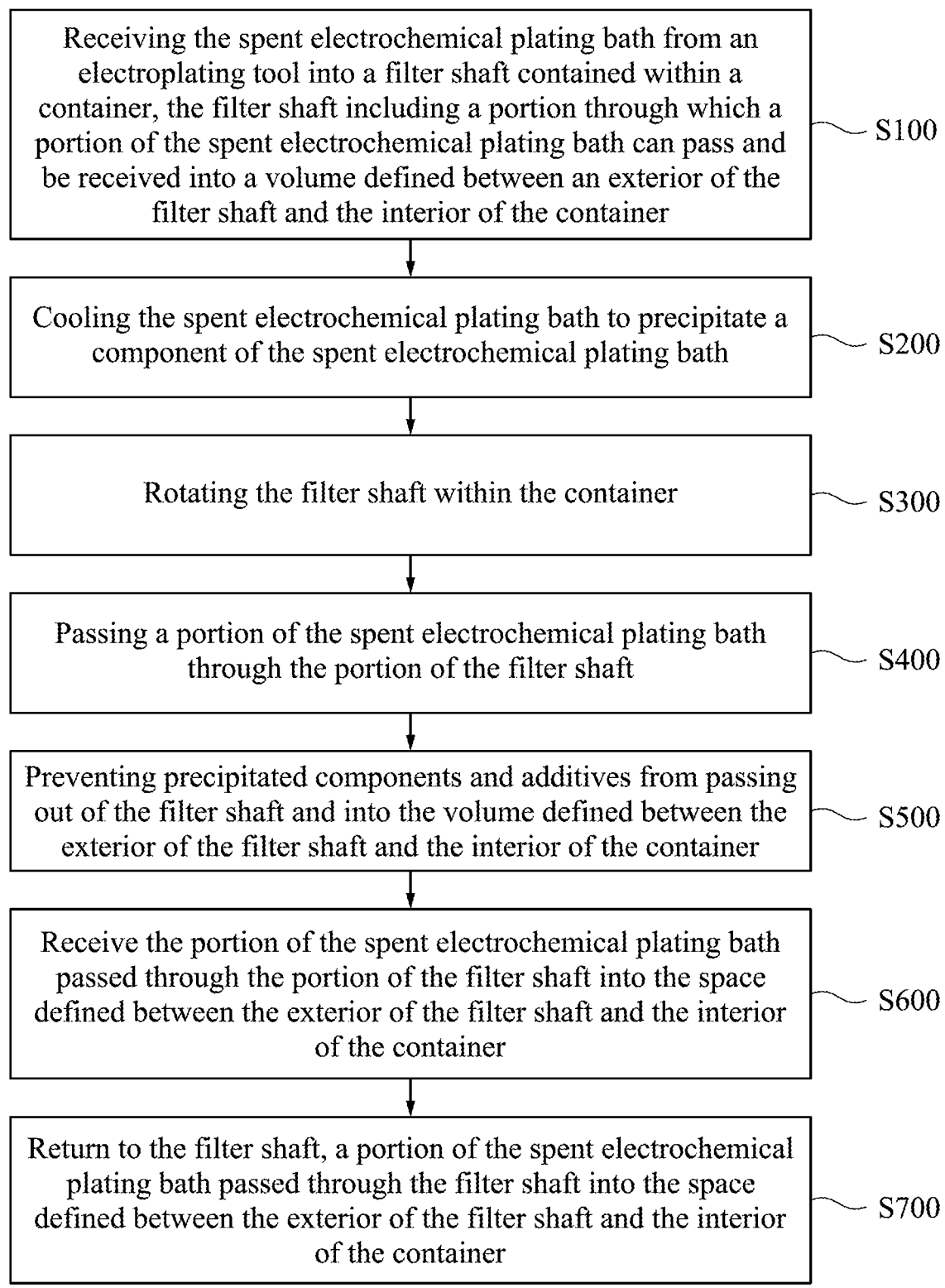
FIG. 6 is a flowchart illustrating a method of treating a spent electrochemical plating bath according to one or more embodiments of the present disclosure.

FIG. 6 is a flowchart illustrating a method of treating a spent electrochemical plating bath according to one or more embodiments of the present disclosure.

Referring to FIG. 6, the method of treating the spent electrochemical plating bath according to one or more embodiments includes: step S100 of receiving spent electrochemical plating bath from an electrochemical plating tool in a filter shaft (i.e., the hollow member 110 and the arm member 120) contained within a container 130; step S200 of cooling the spent electrochemical plating bath in container 130 to precipitate a component of the spent electrochemical plating bath; step S300 of rotating the filter shaft 110, 120 within the container 130; step S400 of passing a portion of the spent electrochemical plating bath through a portion of the filter shaft 110, 120; step S500 of preventing the precipitated component from passing through the filter shaft 110, 120 and into the space defined between the exterior of the filter shaft 110, 120 and the interior of the container 130; step S600 of receiving the portion of the spent electrochemical plating bath passed through the portion of the filter shaft 110, 120 into a space defined between an exterior of the filter shaft 110, 120 and an interior of the container 130; and step S700 of returning to the filter shaft 110, 120, a portion of the spent electrochemical plating bath received into the space defined between the exterior of the filter shaft 110, 120 and the interior of the container 130.

The step S100 of receiving the spent electrochemical plating bath is a step of receiving the spent electrochemical plating bath from the electroplating tool through the first inlet port 132. First inlet port 132 of the container 130 receives the spent electrochemical plating bath from the electrochemical plating tool. Second inlet port 114 of the hollow member 110, which is connected to the first inlet port 132, receives a flow of the received spent electrochemical plating bath into the filter shaft 110, 120.

The step S200 of cooling the spent electrochemical plating bath is a step of lowering the temperature of the spent electrochemical plating bath within container 130. Cooling the spent electrochemical plating bath in container 130 promotes precipitation of additives in the spent electrochemical plating bath. The precipitated additives are more likely to be captured or blocked by the main membrane 152 in filter shaft 110, 120 and the membrane 162 in the filter arm member.

The step S300 of rotating the filter shaft 110, 120 within the container 130 is a step of providing a centrifugal force to fluid contained in the rotating filter shaft 110, 120 which provides a driving force to promote the flow of portions of the spent electrochemical plating bath through the first membrane 152 and the membrane 162. In accordance with some embodiments of the present disclosure, the centrifugal force imparted on the spent electrochemical plating bath drives the precipitates from the spent electrochemical plating bath towards the ends of the arms 120 where the precipitates are blocked by the membrane and collect. Due to the driving force provided by the rotation, the flow of portions of the spent electrochemical plating bath between the first inlet port 132 and the first outlet port 134 can be maintained even when membranes 152, 162 hinder the flow of the bath.

The step S400 of passing the portion of the spent electrochemical plating bath through the portion of the filter shaft 110, 120 is a step wherein a portion of the spent electrochemical plating bath passes through the membranes 152 (when present) and membrane 162. When a portion of the spent electrochemical plating bath moves through the membranes 152, 162, the organic additives and by-products in the spent electrochemical plating bath are blocked and/or captured at the membranes 152, 162 in the filter shaft 110, 120.

In step S500 precipitated components and additives are prevented from passing out of the filter shaft 110, 120 and into the volume defined between the exterior of the filter shaft 110, 120 and the interior of the container 130. As noted above, the filter shaft 110, 120 includes the membranes 152, 162. To prevent precipitated components, organic additives and by-products from passing out of the filter shaft 110, 120, the membranes 152, 162 include a pore size or a chemical make-up that blocks or captures the precipitated components, organic additives and by-products, thus preventing them from passing out of the filter shaft 110, 120 and into the volume defined between the exterior of the filter shaft 110, 120 and the interior of the container 130.

In step S600 the portion of the spent electrochemical plating bath passed through the portion of the filter shaft 110, 120 is received into the volume defined between the exterior of the filter shaft 110, 120 and the interior of the container 130. In some embodiments, the portion of the spent electrochemical plating bath passed through the portion of the filter shaft 110, 120 is substantially free of additives, precipitates and by-products. In accordance with other embodiments, the portion of the spent electrochemical plating bath passed through the portions of the filter shaft 110, 120 includes a level of additives, precipitates and/or by-products that is less than the level of additives, precipitates and/or by-products, respectively, that was present in the spent electrochemical plating bath from the electrochemical plating tool.

As discussed above, in accordance with some embodiments of the present disclosure, if a small amount of the additives and/or precipitates pass through the membranes 152, 162, such additives after entering the volume between the interior of container 130 and the exterior of the filter shaft can precipitate and settle on the bottom of the container 130. Similarly, precipitates that pass through membranes 152 and 162 will settle on the bottom of container 130. When the precipitates settle on the bottom of container 130, they are less likely to be carried out of container 130 by the filtered spent electrochemical plating bath that exits container 130 through first outlet port 134.

In step S700, a portion of the spent electrochemical plating bath passed through the filter shaft 110, 120 into the space defined between the exterior of the filter shaft 110, 120 and the interior of the container 130 is returned to the filter shaft.

Figure 7:
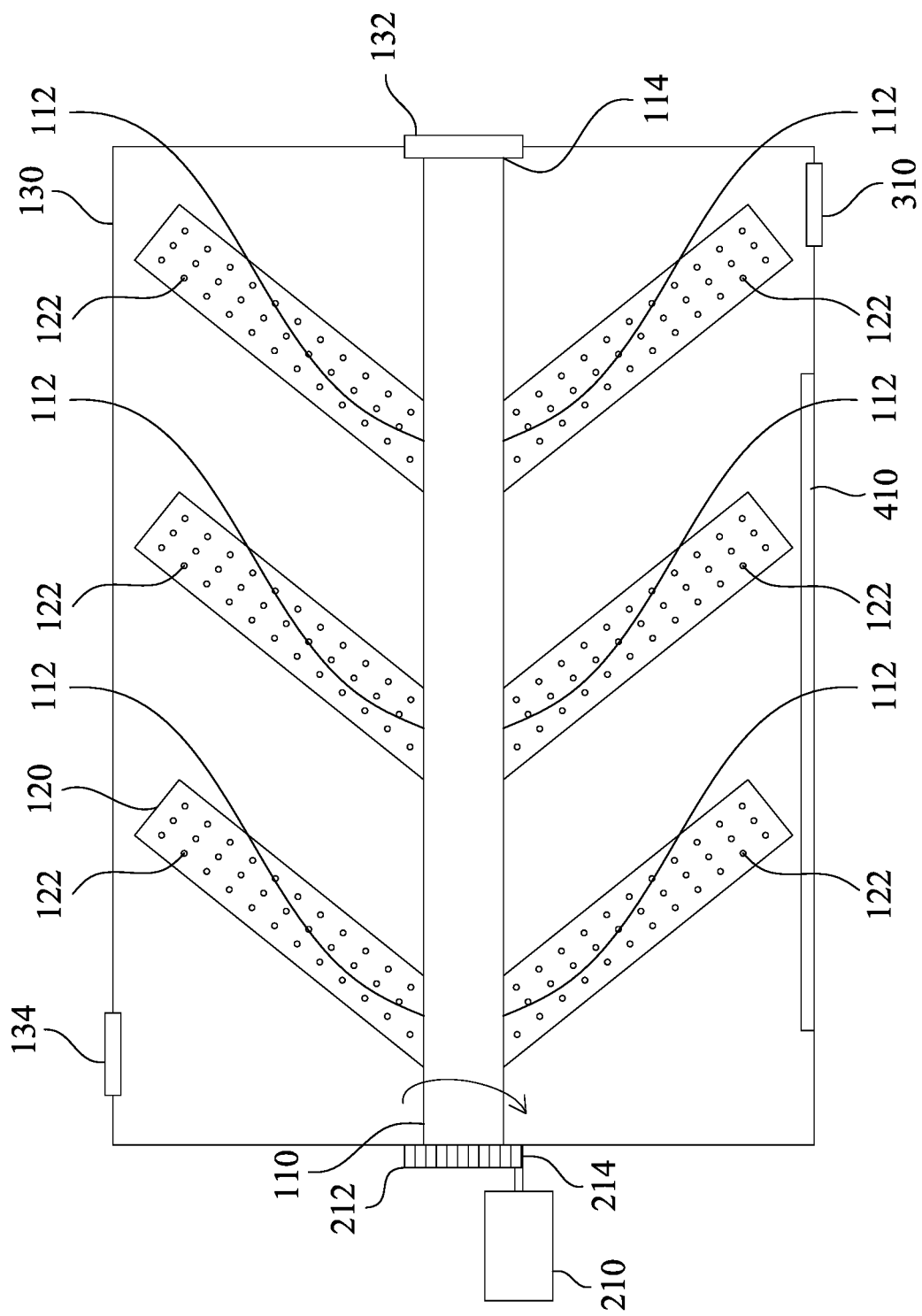
FIG. 7 is a sectional view of the treatment system 100 with the hollow member 110 disposed in a horizontal direction according to one or more embodiments of the present disclosure.

FIG. 7 is a sectional view of the treatment system 100 with the hollow member 110 disposed in a horizontal direction according to one or more embodiments of the present disclosure.

In the illustrated embodiment, the hollow member 110 is disposed with its longitudinal axis positioned in a horizontal direction in FIG. 7.

Referring to FIG. 7, the treatment system 100 includes a hollow member 110, arm member 120, and container 130. In the illustrated embodiment, the hollow member 110 is extended from one side of the container 130 to the other side of the container 130. However, in some embodiments, the hollow member 110 does not extend completely to the other side of the container 130.

In accordance with embodiments illustrated in FIG. 7, the container 130 includes a top side and a bottom side. Container 130 also includes a first inlet port 132 on a first side of the container 130 and a first outlet port 134 on the top of the container 130. First inlet port 132, which is on the first side of the container 130, receives the spent electrochemical plating bath from the electrochemical plating tool. First outlet port 134, which is on the top side of the container 130, discharges the spent electrochemical plating bath after removing the additives from the spent electrochemical plating bath in accordance with the descriptions above. The spent electrochemical plating bath discharged from the first outlet port 134 is collected to be reused.

Other than locations for the first inlet port 132, the first outlet port 134, the second outlet port 310, the embodiment illustrated in FIG. 7 is similar to the embodiment illustrated in FIG. 1 and the description of the components of the embodiment of FIG. 1 apply to the components of the embodiment illustrated in FIG. 7. Therefore, descriptions for the other components in the embodiment in FIG. 7 are not repeated here.

According to one or more embodiments of the present disclosure, the treatment system 100 may reduce the cost of operation of the electrochemical plating process by recycling spent electrochemical plating bath. Instead of dumping the entire spent electrochemical plating bath, the treatment system 100 can be utilized to reuse the spent electrochemical plating bath after removing all or a substantial portion of the organic additive and the by-products. Reusing the spent electrochemical plating bath will reduce the cost of operation and also bring a positive environmental impact.

According to one or more embodiments, a treatment system is provided capable of receiving spent electrochemical plating bath from an electrochemical plating tool and removing organic additives (and by-products of the electrochemical plating process) from the spent electrochemical plating bath. Treatment systems in accordance with the present disclosure includes a container including a top side and a bottom side. The container including a first inlet port on the bottom side of the container and a first outlet port on the top side of the container. The container supports a hollow member disposed in a vertical direction. The hollow member includes a top end and a bottom end and at least one side outlet disposed on a side of the hollow member. An arm member including a first end connected to the side outlet of the hollow member and a second end is provided. The hollow member includes a second inlet port located at its bottom end. The second inlet port of the hollow member is coupled to the first inlet port of the container. Membranes are provided in one or both of the hollow member and the arm member to filter out organic additives and by-products of the electroplating process.

According to one or more embodiments, a treatment system is provided capable of receiving spent electrochemical plating bath from an electroplating tool and removing the organic additives (and by-products) from the spent electrochemical plating bath. The resulting treated spent electrochemical plating bath can be reused in a subsequent electroplating process. Treatment systems in accordance with the present disclosure include a container having its longitudinal axis lying horizontally or vertically. Treatment systems in accordance with the present disclosure include a container having a first inlet port on a first side of the container and a first outlet port on a second side of the container. A hollow member is provided within the container, the hollow member disposed in a horizontal direction. The hollow member includes a first end, a second end and at least one side outlet disposed on a side of the hollow member. The at least one side outlet in fluid communication with a first arm member including a first end and a second end. The first end of the first arm member connected to the side outlet of the hollow member. The hollow member includes a second inlet port located at the second end of the hollow member, the second inlet port coupled to the first inlet port of the container.

According to one or more embodiments, a method of treating a spent electrochemical plating bath includes receiving spent electrochemical plating bath from an electroplating tool into a filter shaft contained within a container. The filter shaft includes a portion through which a portion of the spent electrochemical plating bath can pass and be received into a space defined between an exterior of the filter shaft and the interior of the container. The method includes cooling the spent electrochemical plating bath to promote precipitation of a component of the spent electrochemical plating bath. The filter shaft is rotated within the container to, among other things, promote the passage of portion of the spent electrochemical plating bath through the portion of the filter shaft. The method includes preventing the passage of precipitated components and additives out of the filter shaft and into a volume of the container defined between the exterior of the filter shaft and the interior of the container. The portion of the spent electrochemical plating that passes through the portion of the filter shaft is received into the volume of the container defined between the exterior of the filter shaft and the interior of the container.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A treatment system, comprising:
   a container including a first side and a second side opposite to the first side, the container including a first inlet port on the second side of the container and a first outlet port on the first side of the container, the first side spaced apart from the second side;
   a hollow member in the container, the hollow member including a first end adjacent to the first side and a second end opposite to the first end and adjacent to the second side, the hollow member including a plurality of first holes that extend through the hollow member;
   at least one side outlet disposed on a side of the hollow member;
   an arm member including a third end and a fourth end opposite to the third end, the third end of the arm member connected to the side outlet of the hollow member, the arm member including a plurality of holes that are between the third end and the fourth end, and the plurality of holes extend through the arm member; and
   a second inlet port located at the second end of the hollow member, the second inlet port coupled to the first inlet port of the container.

2. The treatment system according to claim 1, wherein the arm member includes a membrane that is within the arm member, and the membrane is in fluid communication with the plurality of holes.

3. The treatment system according to claim 2, wherein the membrane includes at least one of polypropylene, polyethersulfone, polytetrafluoroethylene, polyvinylidene fluoride, polyamide, ceramic material, or semi-permeable material.

4. The treatment system according to claim 2, wherein the membrane includes at least one pore, wherein a size of the pore is between 0.1 μm and 20 μm.

5. The treatment system according to claim 1, further comprising a filter cartridge within at least one of the arm member or the hollow member.

6. The treatment system according to claim 1, wherein the third end of the arm member is closer to the second side of the container than the fourth end of the arm member.

7. The treatment system according to claim 1, further comprising a drive mechanism coupled to the hollow member.

8. The treatment system according to claim 1, further comprising a second outlet port on the second side of the container.

9. The treatment system according to claim 1, further comprising a heat transfer member, and wherein the container includes a third side and fourth side that extend from the first side to the second side, the third side and the fourth side are transverse to the first side and the second side, and the heat transfer member is at third side of the container.

10. The treatment system according to claim 1, wherein the first outlet port includes a sensor and a first valve, wherein operation of the first valve is based on a signal from the sensor.

11. The treatment system according to claim 1, wherein the first outlet port includes a sensor, a first valve, and a second valve, wherein one of the first valve and the second valve is opened based on a signal from the sensor, and another one of the first valve or the second valve is closed based on the signal from the sensor.

12. The treatment system according to claim 11, wherein one of the first valve or the second valve is connected to the first inlet port of the container.

13. A treatment system, comprising:
   a container including:
   a first side;
   a second side transverse to the first side;
   a third side transverse to the second side and opposite to the first side;
   a first inlet port on the first side of the container; and
   a first outlet port on the second side of the container;
   a hollow member in the container, the hollow member including a first end adjacent to the first side and a second end adjacent to the third side, the hollow member including a plurality of first holes that extend through the hollow member;
   at least one side outlet disposed on a side of the hollow member;
   an arm member including a third end and a fourth end opposite to the third end, the third end of the arm member connected to the side outlet of the hollow member, the arm member includes a plurality of holes that are between the third end and the fourth end, and the plurality of holes extend through the arm member; and a second inlet port located at the second end of the hollow member, the second inlet port coupled to the first inlet port of the container.

14. The treatment system according to claim 13, further comprising a filter cartridge within the arm member.

15. The treatment system according to claim 13, further comprising a membrane comprising a material chosen from at least one of polypropylene, polyethersulfone, polytetrafluoroethylene, polyvinylidene fluoride, polyamide, ceramic material, or semi-permeable material, and the membrane is in fluid communication with the plurality of holes.

16. The treatment system according to claim 13, further comprising a drive mechanism coupled to the hollow member.

17. The treatment system according to the claim 13, further comprising a heat transfer member at the second side of the container.

18. The treatment system according to claim 13, further comprising an electrochemical sensor adjacent the first outlet port.

19. A treatment system, comprising:
a container including:
an exterior;
a first side of the exterior;
a second side of the exterior distinct from the first side;
a first inlet port on the first side of the container; and
a first outlet port on the exterior of the container;
a hollow member in the container, the hollow member including a first end and a second end opposite to the first end, the hollow member including a plurality of first holes that extend through the hollow member;
a first side outlet disposed on the hollow member;
a second side outlet disposed on the hollow member;
a first arm member including a third end and a fourth end opposite to the third end, the third end of the first arm member connected to the first side outlet, the first arm member including a plurality of second holes that extend through the first arm member and that are between the third end and the fourth end of the first arm member;
a second arm member including a fifth end and a sixth end opposite to the fifth end, the fifth end of the second arm member connected to the second side outlet, the second arm member including a plurality of third holes that extend through the second arm member and that re between the fifth end and the sixth end of the second arm member;
a second side inlet port located at the second end of the hollow member, the second inlet port coupled to the first inlet port of the container.

20. The treatment system of claim 19, further comprising at least one filter cartridge in at least one of the first arm member, the second arm member, and the hollow member.

* * * * *